3,039,959
Patented June 19, 1962

3,039,959
PROCESS OF REDUCING BACTERIAL GROWTH IN WATER FLOODING AND WATER DISPOSAL SYSTEMS
William B. Hughes, Webster Groves, Mo., assignor to Petrolite Corporation, Wilmington, Del., a corporation of Delaware
No Drawing. Filed Oct. 6, 1960, Ser. No. 60,773
12 Claims. (Cl. 252—8.55)

This invention relates to biocides and particularly bactericides. In one aspect it relates to water containing the selected bactericides in effective amounts, the water being useful for many purposes requiring water in which bacteria do not multiply. In another aspect it relates to the use of such water for water injection and the recovery of oil from oil sands by displacing the oil with said water.

Bactericides for use in water to produce sterile water, or water in which bacteria and other like microorganisms will not multiply, are useful in many commercial applications. They are especially useful in the art of producing oil, and/or gas, from earth formations containing the same, by displacing the same with water. In these well operations it has been found very difficult to maintain the process if sulfate reducing and/or other anaerobic bacteria are present in the water employed.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is referred to herein as an "open water flooding system." If the water is recirculated in a closed system without substantial aeration, the secondary recovery method is referred to herein as a "closed water flooding system."

In many oil fields large volumes of water are produced and must be disposed of where water flooding operations are not in use or where water flooding operations cannot handle the amount of produced water. Most states have laws restricting pollution of streams and land with produced waters, and oil producers must then find some method of disposing of the waste produced salt water. In many instances therefore, the salt water is disposed of by injecting the water into permeable low pressure strata below the fresh water level. The formation into which the water is injected is not the oil producing formation and this type of disposal is defined as salt water disposal or waste water disposal. Bacterial problems herein are analogous to those encountered in the secondary recovery operation by water flooding.

The success, or failure, of a water flood or water injection of an earth formation may rest in certain instances on the ability of the operator to control the growth of sulfate reducing bacteria in his injection water. These organisms cause corrosion of the well pipe by accelerating galvanic corrosion. Still more serious is their ability to rapidly reduce sulfates present in the injection water to sulfides, which react with the soluble iron salts in the water to form insoluble iron sulfide which causes serious plugging of the formation into which the water is being injected.

The sulfate-reducing microorganisms include the genus Desulfovibria and a particular species commonly found in oil field water is *Desulfovibria desulfuricans*.

Considerable effort has been made in the prior art to control such bacteria and other microorganisms in the water used for these purposes, but the amounts of bactericide necessary have often been excessive from an economical standpoint, and/or the effectiveness of the proposed bactericides has often been poor, especially as to sulfate reducing bacteria.

One object of the present invention is to provide a novel additive for water for killing, reducing the number of and/or inhibiting the growth of bacteria in water.

Another object is to provide a novel aqueous liquid compound resistant to bacteria, and the like, comprising water and said additive.

Another object is to provide novel processes of treating wells with such water containing said additive.

Another object is to provide processes for water injection and for producing oil and/or gas from sands containing the same by displacement by such water containing said additive, by water drive, water flooding, and/or repressuring such formation with such water.

Numerous other objects and advantages will be apparent to those skilled in the art upon reading the accompanying specification and claims.

I have now discovered that the compounds disclosed herein are effective in accomplishing the above objectives.

The bactericidal compounds useful in this invention are reducing compounds derived from the reaction of aldehydes, preferably formaldehyde, and oxides of sulfur and salts thereof, and most preferably formaldehyde sulfoxylic acids and salts thereof. Because of their commercial availability, the preferred embodiments are the alkali metal salts (i.e. sodium, potassium, etc. salts) of formaldehyde sulfoxylic acid and especially sodium formaldehyde sulfoxylate, $HOCH_2SO_2Na$.

The reducing compositions useful in this invention include those derived from the reaction of aldehydes and the oxides of sulfur and salts thereof. Examples of these compositions include the aldehyde sulfoxylic acids,

wherein R is H or a hydrocarbon group such as alkyl, aryl, aralkyl, alkaryl, cycloalkyl, etc., but preferably hydrogen; and salts thereof. Since aldehyde sulfoxylic acids are unstable, salts thereof are employed. Because alkali metal salts of the sulfoxylates derived from formaldehyde, particularly the sodium salt, are readily available, the present invention will be described in terms of this compound, $HOCH_2SO_2Na$. In addition, ammonium and amino salts thereof can also be employed. These compounds can be prepared by a variety of methods including:

(1) The reduction of sodium formaldehyde bisulfite:

$$HOCH_2SO_3Na + H_2 \rightarrow HOCH_2SO_2Na + H_2O$$

(2) The reaction of formaldehyde with sodium hydrosulfite in the presence of caustic soda:

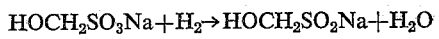

(3) The reaction of formaldehyde with sodium hydrosulfite in aqueous solution to form equimolar quantities of sodium formaldehyde sulfoxylate and sodium formaldehyde bisulfite, often referred to as "sodium formaldehyde hydrosulfites."

(4) The reaction of zinc, formaldehyde, and sulfur dioxide are at 80° C., followed by reaction with NaOH to yield a reducing composition of this type.

Rohm & Haas Company sells sodium formaldehyde sulfoxylate ($NaHSO_2CH_2O2H_2O$) under the trademark "Formopon."

Water flood and waste disposal operations are too well known to require further elaboration. In essence, in the present process, the flooding operation is effected in the conventional manner except that the flooding medium contains a minor amount of the reducing compound, sufficient for bactericidal action, i.e. to kill, reduce or inhibit bacteria in concentrations of about 1 p.p.m. to 1000 p.p.m., or more, for example 1–25 p.p.m., but preferably 1–10. The upper limiting amount of reducing compounds is determined by economic considerations. Since the success of a water flooding operation manifestly depends upon its total cost being less than the value of the additional oil recovered from the oil reservoir, it is quite important to use as little as possible of these reducing compounds consistent with optimum performance. Optimum performance is generally obtained employing 5–10 p.p.m. Since these compounds are themselves inexpensive and are used in low concentrations, they enhance the success of a flood operation by lowering the cost thereof.

EXAMPLE

The following is presented for purposes of example and not of limitation.

The reducing compositions of this invention were actually tested in a field operation on a water flood project in which sulfate-reducing bacteria were a problem.

The flooding operation was carried out in the conventional manner except that the flooding medium was controlled so that it contained 6 p.p.m. of sodium formaldehyde sulfoxylate. Samples were taken from five points on the system. The concentration was maintained at 6 p.p.m. by additions to the filter effluent. Treatment for a period of about three months produced significant bacterial reduction as is evident from the following table, in which the figures therein represent cells/cm.$^3$. These figures were obtained according to the procedure described in API–RD–38.

Table I

|  | Accelator Effluent | Filter Effluent | Pump Discharge | Water Intake Well A | Water Intake Well B |
|---|---|---|---|---|---|
| Initally | 15–16 | 66–101 | 235–340 | 530–340 | 570–615 |
| 2 weeks later | 3–6 | 42–32 | 32–20 | 61–95 | 170–95 |
| 3 mos. later | 3–2 | 0–5 | 11–8 | 3–6 | 10–7 |

From this table it is evident that the present bactericide is a very effective one.

Other suitable reducing compounds within the scope of this invention are also effective.

While the flooding medium employed in accordance with the present invention contains water or oil field brine and the reducing compounds, the medium may also contain other materials. For example, the flooding medium may also contain other agents such as surface active agents or detergents which aid in wetting throughout the system and also promote the desorption of residual oil from the formation, deflocculants sequestering agents which prevent the deposition of calcium and/or magnesium compounds in the interstices of the formation, corrosion inhibitors, tracers, etc. Similarly, they may be employed in conjunction with any of the operating techniques commonly employed in water flooding and water disposal, processes for example five spot flooding, peripheral flooding, etc. and in conjunction with other secondary recovery methods.

In addition, these compounds are effective against other anaerobic and aerobic bacteria, for example, those found in oil fields, particularly the aerobic bacteria found in slimes. In addition, they are effective algaecides and slimicides, particularly if the flooding system involves an open pond or pool, as is frequently the case.

The term, "reduce" employed in the claims refers to "killing, reducing the number of, and/or inhibiting" the growth of bacteria.

This application is copending with my application Serial No. 845,325, filed on October 9, 1959.

Having thus described my invention, what I claim as new and desire to obtain by Letters Patent is:

1. A process of reducing bacterial growth in an aqueous system containing bacterial characterized by employing in said aqueous system containing said bacteria a compound selected from the group consisting of an aldehyde sulfoxylate and a salt thereof.

2. The process of claim 1 wherein the reducing compound is a water soluble salt of an aldehyde sulfoxylate.

3. The process of claim 2 wherein the reducing compound is a water soluble salt of a formaldehyde sulfoxylate.

4. The process of claim 3 wherein the reducing compound is sodium formaldehyde sulfoxylate.

5. The process of claim 4 wherein the concentration of sodium formaldehyde sulfoxylate is 1–1000 p.p.m.

6. The process of claim 5 wherein the concentration of sodium formaldehyde sulfoxylate is 5–10 p.p.m.

7. A process of reducing bacterial growth in water flooding and water disposal systems containing bacteria which is characterized by injecting into an underground formation an aqueous solution of a compound selected from the group consisting of an aldehyde sulfoxylate and a salt thereof.

8. The process of claim 7 wherein the reducing compound is a water-soluble salt of an aldehyde sulfoxylate.

9. The process of claim 8 wherein the reducing compound is a water-soluble salt of a formaldehyde sulfoxylate.

10. The process of claim 9 wherein the reducing compound is sodium formaldehyde sulfoxylate.

11. The process of claim 10 wherein the concentration of sodium formaldehyde sulfoxylate is 1–1000 p.p.m.

12. The process of claim 11 wherein the concentration of sodium formaldehyde sulfoxylate is 5–10 p.p.m.

References Cited in the file of this patent

UNITED STATES PATENTS

| 1,143,114 | Fuller | June 15, 1915 |
| 1,399,007 | Cushman | Dec. 6, 1921 |
| 2,125,375 | Hinegardner | Aug. 2, 1938 |
| 2,692,231 | Stayner et al. | Oct. 19, 1954 |
| 2,839,467 | Hutchison et al. | June 17, 1958 |
| 2,882,227 | Lindberg | Apr. 14, 1959 |

OTHER REFERENCES

Walker: Formaldehyde, 2nd Ed., pub. 1953 by Reinhold Pub. Co., N.Y., pages 194, 195 and 489.